United States Patent
Wei et al.

(10) Patent No.: US 10,630,543 B1
(45) Date of Patent: Apr. 21, 2020

(54) WIRELESS MESH NETWORK IMPLEMENTATION FOR IOT DEVICES

(71) Applicant: AMAZON TECHNOLOGIES, INC., Seattle, WA (US)

(72) Inventors: QingYun Wei, San Jose, CA (US); Jin Guo, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 15/462,197

(22) Filed: Mar. 17, 2017

(51) Int. Cl.
| | | |
|---|---|---|
| H04W 4/70 | (2018.01) | |
| H04L 12/24 | (2006.01) | |
| H04L 29/12 | (2006.01) | |
| H04L 12/761 | (2013.01) | |
| H04W 8/22 | (2009.01) | |
| H04W 84/12 | (2009.01) | |
| H04W 84/18 | (2009.01) | |

(52) U.S. Cl.
CPC ...... H04L 41/0813 (2013.01); H04L 41/0866 (2013.01); H04L 45/16 (2013.01); H04L 61/2015 (2013.01); H04L 61/6022 (2013.01); H04W 4/70 (2018.02); H04W 8/22 (2013.01); H04W 84/12 (2013.01); H04W 84/18 (2013.01)

(58) Field of Classification Search
CPC ...... H04L 61/10; H04L 61/103; H04L 61/20; H04L 61/2007; H04L 61/2015; H04L 41/0813; H04L 41/0866; H04L 45/16; H04L 61/6022; H04W 88/04; H04W 4/70; H04W 8/22; H04W 84/18; H04W 84/12
See application file for complete search history.

(56) References Cited

U.S. PATENT DOCUMENTS

| | | | | |
|---|---|---|---|---|
| 2002/0147844 A1* | 10/2002 | Denecheau | ....... | H04L 29/12009 709/245 |
| 2002/0156613 A1* | 10/2002 | Geng | ....... | H04L 12/28 703/23 |
| 2003/0130833 A1* | 7/2003 | Brownell | ....... | H04L 29/12009 703/23 |
| 2006/0133341 A1* | 6/2006 | Chari | ....... | H04L 29/12018 370/338 |
| 2008/0170494 A1* | 7/2008 | Enoki | ....... | H04L 12/66 370/221 |
| 2012/0051364 A1* | 3/2012 | Fujita | ....... | H04L 45/00 370/401 |
| 2014/0078986 A1* | 3/2014 | Kaippallimalil | ....... | H04W 76/10 370/329 |

(Continued)

OTHER PUBLICATIONS

"Dynamic Host Configuration Protocol", RFC 1531, Oct. 1993, pp. 1-39 (Year: 1993).*

*Primary Examiner* — Un C Cho
*Assistant Examiner* — Kenan Cehic
(74) *Attorney, Agent, or Firm* — Lowenstein Sandler LLP

(57) ABSTRACT

A softAP bridge is created to support a mesh network that also works seamlessly with any home Wi-Fi AP routers by using Layer-3 techniques to simulate a Layer-2 bridge. With this softAP bridge, Wi-Fi chipsets with integrated special Wi-Fi MAC Layer-2 mesh network support (e.g., 802.11s), or external gateway hubs, are not required. To accomplish this solution, one of the wireless capable devices may be designated as a relay device for communicating data packets between a home AP router and the remaining wireless capable devices that are designated as client devices.

16 Claims, 10 Drawing Sheets

(56) References Cited

U.S. PATENT DOCUMENTS

| | | | |
|---|---|---|---|
| 2015/0117420 A1* | 4/2015 | Raman | H04L 61/103 370/338 |
| 2015/0222474 A1* | 8/2015 | Hartley | H04L 29/08648 370/338 |
| 2015/0236752 A1* | 8/2015 | Cruz | H04L 63/1408 375/135 |
| 2018/0098374 A1* | 4/2018 | Bhatnagar | H04W 4/00 |
| 2018/0131670 A1* | 5/2018 | Bergeron | H04L 45/24 |
| 2018/0309573 A1* | 10/2018 | Agiwal | H04L 9/0861 |

\* cited by examiner

300

1000

| Transaction Table ||
| --- | --- |
| Device ID of Device Submitting DHCP Request (Lookup Key) | Request ID |
| MAC:00:00:00:00:00:04 | DHCP Request from client node 130 |
| Device ID 2 | Request ID 2 |
| . | . |
| . | . |
| . | . |

Figure 10

WIRELESS MESH NETWORK IMPLEMENTATION FOR IOT DEVICES

BACKGROUND

With the advancements in wireless communication technology, internetworking a number of wireless capable devices to define a mesh network is now achievable to accomplish previously unavailable features. This internetworking of devices has been referred to generally as the Internet of Things (IoT). An IoT network of wireless capable devices may communicate over, for example, Wi-Fi technology.

However, a common problem encountered when using Wi-Fi technology to sustain an IoT network is the physical range limitations in Wi-Fi signal coverage by a single Wi-Fi Access Point (AP). In other words, a single Wi-Fi AP device may not support the range to cover all desired IoT devices to be included in the IoT network when the IoT devices are physically located beyond the range of the single Wi-Fi AP device.

It follows that within the context of wireless communication technology for creating a network of wireless capable devices, there exists a need to extend the wireless range of the network beyond the Wi-Fi signal range of a Wi-Fi AP. As a result, networks can be created that cover wireless capable devices positioned over a broader physical area than the physical area covered by the Wi-Fi signal range of the Wi-Fi AP.

DESCRIPTION OF THE FIGURES

The detailed description is set forth with reference to the accompanying drawings. The use of the same reference numbers in different figures indicates similar or identical items or features. Various embodiments in accordance with the present disclosure will be described with reference to the drawings, in which:

FIG. 10 shows an exemplary transaction table.

DETAILED DESCRIPTION

Figure 1:
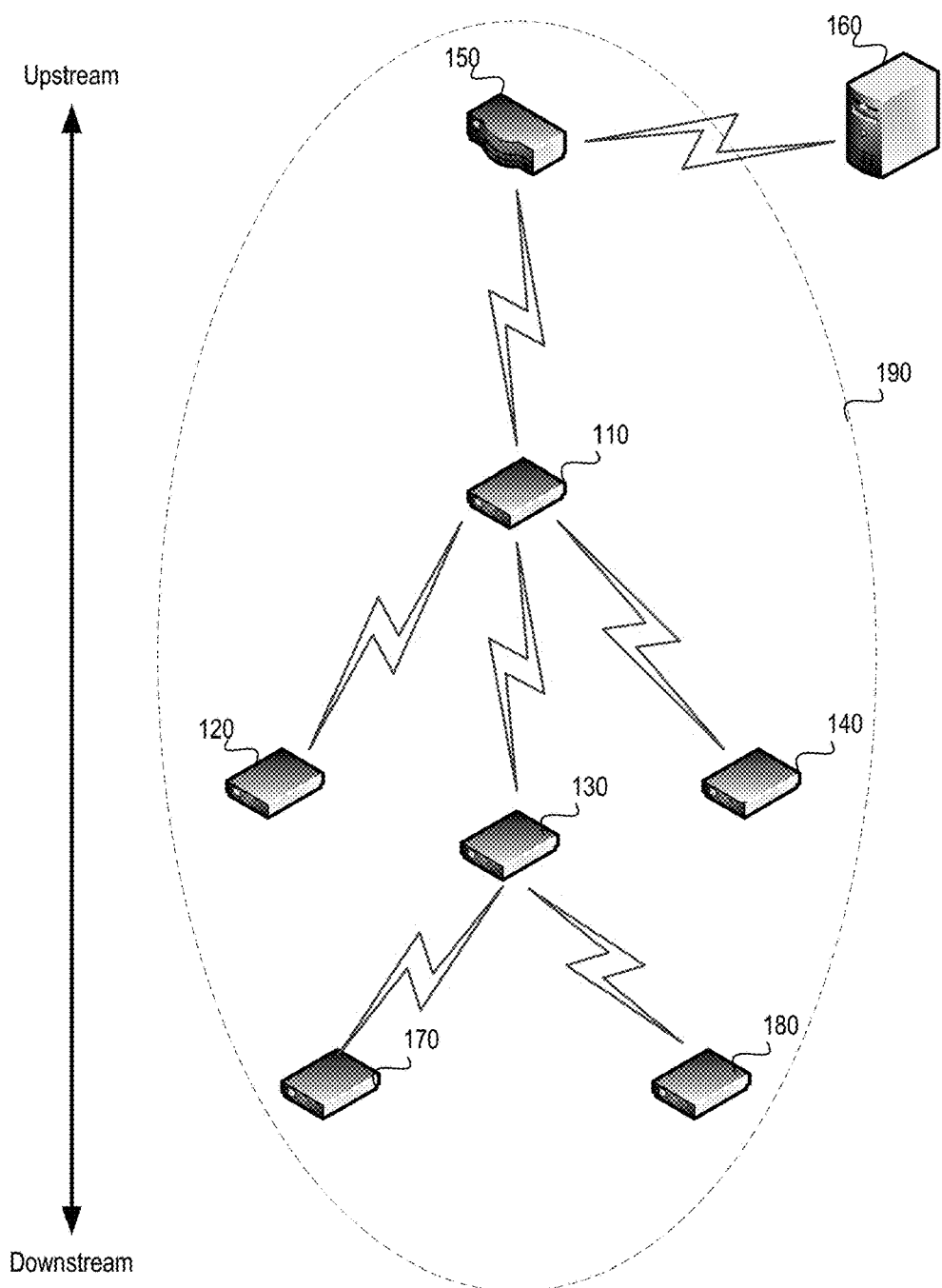
FIG. 1 shows an exemplary mesh network system arranged in a tree mesh architecture.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

To extend the Wi-Fi signal range of a Wi-Fi AP to cover a broader physical area than the physical area covered by the Wi-Fi signal range of the Wi-Fi AP, a solution for creating a mesh network by utilizing wireless capable devices in combination with the Wi-Fi AP is presented by this disclosure. By utilizing the wireless capable devices themselves to form the mesh network, the resulting mesh network breaks past the Wi-Fi AP's range boundary. The wireless capable devices described herein may include smartphones, tablet computers, laptop computers, desktop computers, home automation devices, or other smart computing devices that include wireless communication circuitry (e.g., Wi-Fi chip hardware).

Currently, there exists a standard (IEEE 802.11s) that defines a Wi-Fi MAC layer (OSI Layer-2) for establishing mesh network protocols to create such a mesh network between wireless capable devices. However, the complexity of the 802.11s protocol makes it prohibitive for its adoption into legacy Wi-Fi chipsets that are installed on most wireless capable devices. Due to legacy Wi-Fi chipsets often times not being manufactured with the 802.11s protocol enabled, wireless capable devices including such legacy Wi-Fi chipsets are without a convenient preinstalled solution for creating a mesh network with other wireless capable devices having similar legacy Wi-Fi chipsets that are not enabled to implement the 802.11s protocol.

In view of the 802.11s protocol failing to be installed onto most legacy Wi-Fi chipsets, an innovative network architecture is proposed by this disclosure to help implement a Wi-Fi mesh network using the available Wi-Fi protocols on legacy Wi-Fi chipsets. This technical solution is available on wireless capable devices that support simultaneous Wi-Fi client STA (station) and p2p-GO (p2p group owner) interfaces, which are known to be available on even the most basic (i.e., cheap) Wi-Fi chipsets.

In this disclosure, the proposed mesh network creating solution looks to operate in an IP layer (network Layer-3 by ISO OSI model's seven layer networking definition) to simulate a MAC layer (data link Layer-2) mesh network. Thus the proposed solution creates a softAP bridge to support a mesh network and also works seamlessly with any home Wi-Fi AP routers by using Layer-3 techniques to simulate a Layer-2 bridge. With this softAP bridge, Wi-Fi chipsets with integrated special Wi-Fi MAC Layer-2 mesh network support (e.g., 802.11s), or external gateway hubs, are not required. To accomplish this solution, one of the wireless capable devices may be designated as a master device that communicates with a home AP router and also operates as a relay to the remaining client wireless capable devices (client devices/nodes). Each of the wireless capable devices (master device, client device) may be a station device with the capability to use certain known Wi-Fi protocols such as 802.11. The technical solution also achieves the softAP bridge by creating two networks that operate within the same IP sub-network to achieve a "zero-configuration" for an end-user of the mesh network where the master device is otherwise transparent between the client devices and the home AP router. The two networks include a first physical network between the master device and the home AP router, and a second physical network between the master device and its client devices.

FIG. 1 shows an exemplary mesh network system 100 arranged in a tree mesh architecture 190. The mesh network system 100 includes a plurality of wireless capable devices such as a client node 120, a client node 130, a client node 140, a client node 170, a client node 180, and a relay node 110 (may also be referred to as a master node 110). Each of the client node 120, the client node 130, the client node 140, the client node 170, the client node 180, and the relay node 110 may be the same, or similar, type of wireless capable device such as a smartphone, tablet computer, laptop computer, desktop computer, home automation device, or other smart computing device enabled for wireless capabilities. The mesh network system 100 also includes a home AP router 150, where the home AP router 150 may further communicate with another wireless capable device 160 that is not necessarily part of the tree mesh architecture 190. Within the mesh network system 100, the home AP router 150 also serves as a dynamic host configuration protocol (DHCP) server for assigning IP addresses to devices connected to the mesh network system 100.

The tree mesh architecture 190 is characterized by utilizing certain node devices as relay devices that bridge communication between upstream parent node devices and downstream child node devices to enable communication between the parent and child node devices. For example, the relay node 110 operates to bridge communication between the child nodes (the client node 120, the client node 130, and the client node 140) and the upstream home AP router 150.

The tree mesh architecture 190 further supports multiple relay devices bridged together in a daisy-chain configuration. For example, a daisy-chain configuration is shown that includes the client node 170, the client node 130, the relay node 110, and the home AP router 150. In this daisy chain configuration, the relay node 110 operates as a first level relay device and the client node 130 operates as a second level relay device. So a request communication transmitted by the client node 170 (or the client node 180) is received by the client node 130 operating as the second level relay device, and the client node 130 relays the request communication upstream to the relay node 110 operating as the first level relay device. The relay node 110 receives the request communication from the client node 130, and the relay node 110 relays the request communication upstream to the home AP router 150. After receiving the request communication, the home AP router 150 generates a response communication and transmits the response communication. The relay node 110 operating as the first level relay device receives the response communication from the home AP router 150, and the relay node 110 relays the response communication downstream to the client node 130. The client node 130 operating as the second level relay device receives the response communication from the relay node 110, and the client node 130 relays the response communication downstream to the client node 170 (or the client node 180, whichever transmitted the request communication). This daisy-chain configuration is also extendable for additional layers of node devices, which in turn results in additional layers of node devices operating as a relay device. For each wireless capable device within the tree mesh architecture 190 that operates as a relay device (e.g., the relay node 110) bridging communication between a downstream child node and an upstream parent node, including when the client nodes are connected in the daisy-chain configuration, the features described below that are attributable to the relay node 110 to achieve the virtual bridging (softAP bridge) capabilities may apply.

Figure 2:
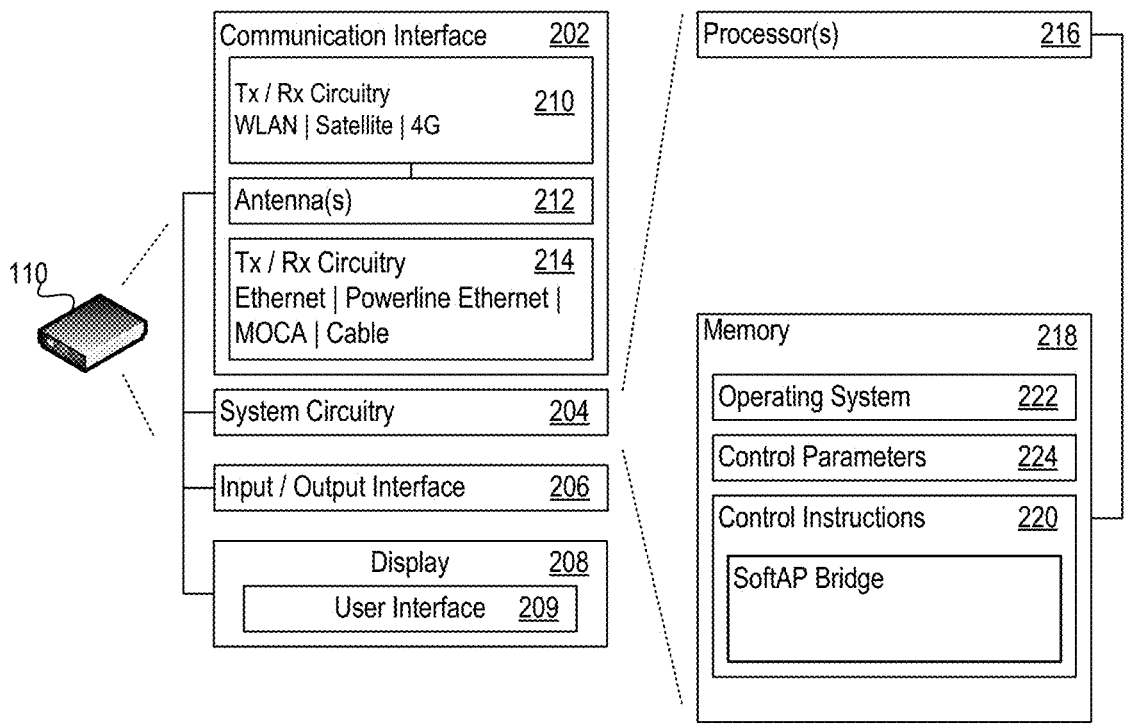
FIG. 2 shows an exemplary computer architecture of a computing device included in the mesh network system shown in FIG. 1, in accordance with the disclosure.

FIG. 2 shows a computer architecture for the relay node 110 included in the mesh network system 100 shown in FIG. 1. Although the relay node 110 is depicted in FIG. 2, some, or all, of the same components described within the computer architecture of the relay node 110 as shown in FIG. 2 may also be applicable to the computer architecture of the other computing devices included in the mesh network system 100.

The computer architecture of the relay node 110 includes a communication interface 202 (e.g., an upstream interface and a downstream interface of the relay node 110), a system circuitry 204, an input/output interface 206, and a display 208 on which a user interface 209 may be generated for interacting with a user of the relay node 110. The upstream interface and the downstream interface described as being included in the relay node 110 may be virtual interfaces operated through the same physical communication interface 202.

The user interface 209 and the input/output interface 206 may include a graphical user interface (GUI), touch sensitive display, voice or facial recognition inputs, buttons, switches, speakers, microphones and other user interface elements. Additional examples of the input/output interface 206 include, without limitation, microphones, video and still image cameras, headset and microphone input/output jacks, Universal Serial Bus (USB) connectors, memory card slots, and other types of inputs. The input/output interface 206 may further include magnetic or optical media interfaces (e.g., a CDROM or DVD drive), serial and parallel bus interfaces, and keyboard and mouse interfaces. According to some embodiments, the user interface 209 may prompt a user to input data through the input/output interface 206. The user inputs through the input/output interface 206 may then be stored on the memory 218.

The communication interface 202 may include wireless transmitters and receivers ("transceivers") 210 and any antennas 212 used by the Tx/Rx circuitry of the transceivers 210. The transceivers 210 and the antennas 212 may be part of a Wi-Fi chipset for supporting Wi-Fi network communications under, for instance, any version of IEEE 802.11, e.g., 802.11n or 802.11ac. The communication interface 202 may also include wireline transceivers 214. The transceivers 214 may provide physical layer interfaces for any of a wide range of communication protocols, such as any type of Ethernet, data over cable service interface specification (DOCSIS), powerline Ethernet, multimedia over coax alliance (MOCA), mDNS, upnp, iptv, or other protocol. The communication interface 202 may further be representative of Wi-Fi interfaces such as an upstream interface for communicating with wireless capable devices that are upstream the relay node 110 within the tree mesh architecture 190, and a downstream interface for communicating with wireless capable devices that are downstream the relay node 110 within the tree mesh architecture 190. Through control of these different interfaces, the processes for controlling the operation of the relay node 110 for creating the softAP bridge is applicable to implement other application layer gateway functions across any supportable communication protocol (either wired or wireless).

The system circuitry 204 may include any combination of hardware, software, middleware, circuitry, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 may be part of the implementation of any desired functionality in the operation of the relay node 110. As just one example, the system circuitry 204 may include one or more processors 216 and memory 218. The memory 218 stores, for example, control instructions 220 for implementing the softAP bridge on the relay node 110, as well as instructions for an operating system 222 running on the relay node 110. The processors 216 may execute the control instructions 220 and the operating system 222 to carry out any desired functionality for the relay node 110. Control parameters 224 may provide and specify configuration and operating options for the control instructions 220, operating system 222, and other functionality of the relay node 110. The application server may also include storage devices (e.g., hard disk drives (HDDs) and solid state disk drives (SSDs)), as represented by the memory 218.

Figure 3:
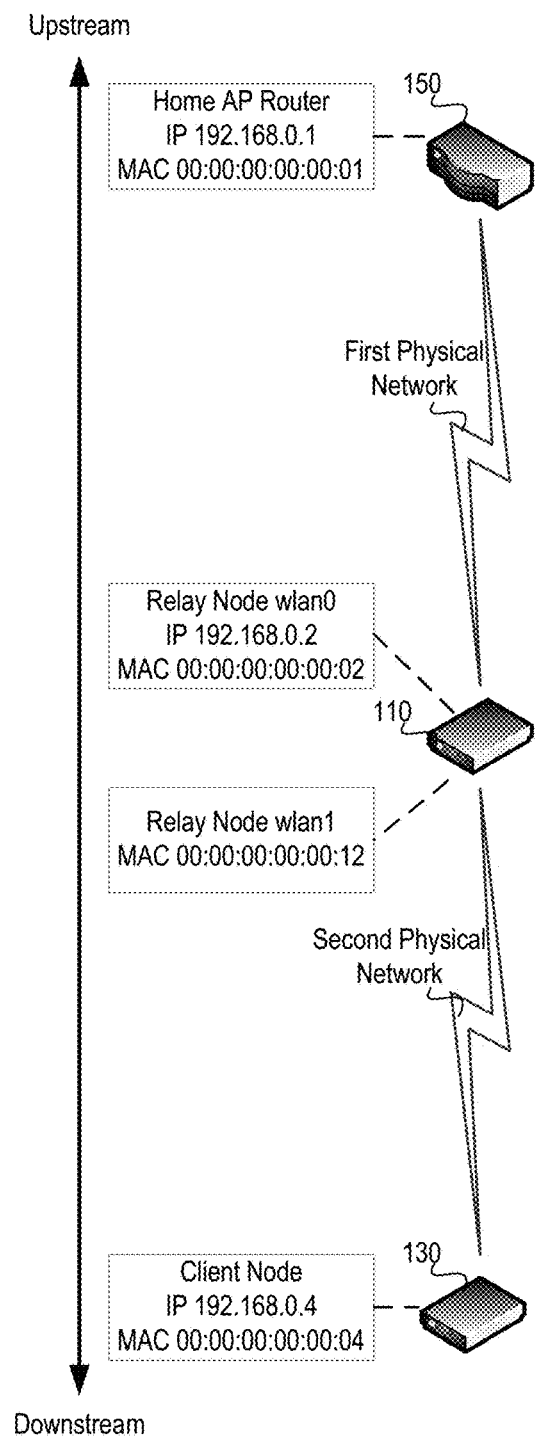
FIG. 3 shows a partial view of the mesh network system shown in FIG. 1 and corresponding device identification information assigned to the component devices.

FIG. 3 shows a partial view 300 of the mesh network system 100 shown in FIG. 1, including the relay node 110, the client node 130, and the home AP router 150. FIG. 3 also identifies exemplary device network addresses (e.g., IP addresses) and device identification or identifier (e.g., MAC addresses) assigned to the component devices within the mesh network system 100. The device network addresses and device identification may more generally be referred to as an identifier. The component devices within the partial view 300 of the mesh network system otherwise operate as described with reference to FIG. 1. The partial view 300 of the mesh network system 100 provides directional reference for upstream devices and communications, as well as downstream devices and communications. Communications between the relay node 110 and the home AP router 150 are made through a first physical network. Communications between the relay node 110 and the client node 130 are made through a second physical network. The partial view 300 of the mesh network system 100 is provided for exemplary purposes, as additional wireless capable devices may be in communication with the relay node 110 or client node 130, as shown by the mesh network system shown in FIG. 1.

The relay node 110 includes an upstream interface "Relay Node wlan0" identified by an IP address of 192.168.0.2 and a MAC address of 00:00:00:00:00:02. The relay node 110 also includes a downstream interface "Relay Node wlan1" identified by a MAC address of 00:00:00:00:00:12. The home AP router 150 is identified by an IP address of 192.168.0.1 and a MAC address of 00:00:00:00:00:01. The client node 130 is identified by an IP address of 192.168.0.4 and a MAC address of 00:00:00:00:00:04. For exemplary purposes, these identification values will hold true for the rest of this disclosure.

Figure 4:
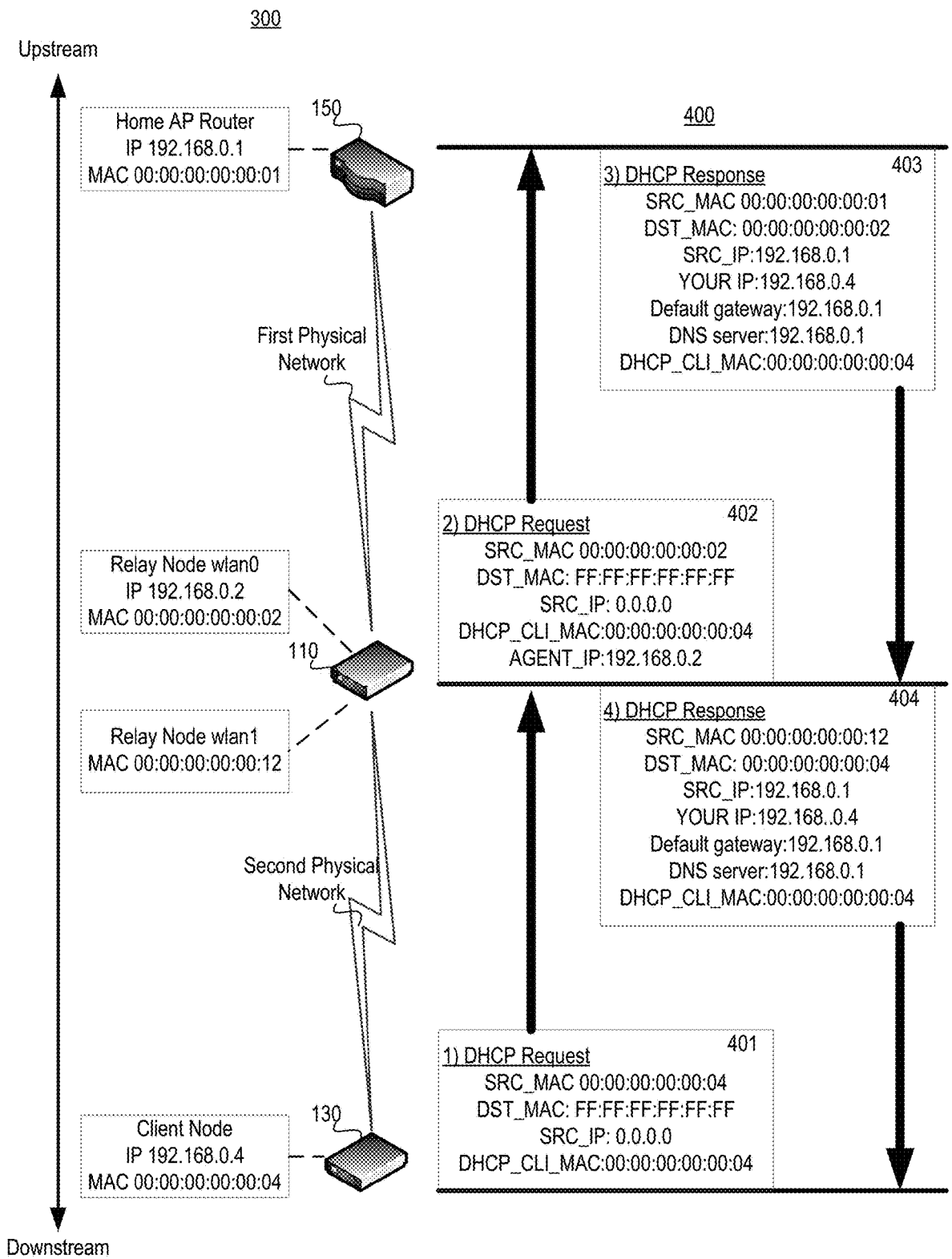
FIG. 4 shows a partial view of the mesh network system shown in FIG. 1 and corresponding communication between component devices for implementing a relay process.

FIG. 4 shows the partial view 300 of the mesh network system 100, and further shows a corresponding flow diagram 400 describing a dynamic host configuration protocol (DHCP) relay process implemented between the component devices within the partial view 300 of the mesh network system 100.

Initially, the client node 130 broadcasts a DHCP request to the relay node 110 on the physical Layer-2 to try and locate a DHCP server that will assign an IP address to the client node 130 (401). The DHCP request is a data packet including a source MAC address (SRC_MAC 00:00:00:00:00:04) and a DHCP client MAC address (DHCP_CLI_MAC:00:00:00:00:00:04). In the DHCP request, the data packet does not yet know the destination MAC address (DST_MAC: FF:FF:FF:FF:FF:FF), and also does not yet know the client node's 130 own source IP address (SRC_IP: 0.0.0.0).

When the client node 130 broadcasts its DHCP request, the client node 130 has not yet established communication with the home AP router 150 (i.e., the DHCP server) through the second physical network that exists between the relay node 110 and the home AP router 150. Therefore, the relay node 110 is responsible for receiving the DHCP request from the client node 130 through its downstream interface for the second physical network (relay node wlan1), and relaying the DHCP request to the home AP router 150 through its upstream interface for the first physical network (relay node wlan0) (402). The relay node 110 is able to relay the DHCP request to the home AP router 150 appropriately because the relay node 110 has previously established communication with the home AP router 150 through the first physical network.

The relay node 110 acts as a "bridge" between the client node 130 and the home AP router 150 by receiving the DHCP request through the downstream interface (relay node wlan1) and relaying the DHCP request to the home AP router 150 through the upstream interface (relay node wlan0). Before relaying the DHCP request to the home AP router 150, the relay node 110 parses the received DHCP request and updates the source MAC address in the DHCP request by modifying the source MAC address in the DHCP request to the MAC address related to the relay node's 110 upstream interface (SRC_MAC 00:00:00:00:00:02). The relay node 110 also updates the DHCP request by setting an agent IP address to include the upstream interface's IP address (AGENT_IP:192.168.0.2). The relay node 110 implements these updates while maintaining the client node's 130 MAC address as the DHCP client MAC address (DHCP_CLI_MAC:00:00:00:00:00:04).

By updating the source MAC address in the DHCP request to identify the relay node 110 and not the client node 130 requesting the IP address assignment, the relay node 110 ensures the home AP router 150 will transmit a response back to the relay node 110. The relay node 110 further creates a new entry into a transaction table stored on a memory of the relay node 110 for tracking which wireless capable device has submitted the DHCP request. The transaction table may be a lookup table where each entry is comprised of a lookup key identifying a device ID for a wireless capable device that submitted a DHCP request and a corresponding request ID identifying the DHCP request. The request ID may also be a transaction ID for identifying a message request and response transaction. FIG. 10 shows an exemplary transaction table 1000 that includes a first lookup key identifying the client node's 130 device ID, and a first request ID identifying the DHCP request submitted by the client node 130. The transaction table 1000 also include additional entries comprised of device ID/request ID pairs. So by using the device ID to look up an entry in the transaction table 1000, the relay node 110 is able to match the specific DHCP request to the wireless capable device having submitted the DHCP request. Here, the transaction table 1000 stored by the relay node 110 identifies the client node 130 as the device submitting the DHCP request by creating a new entry comprised of the client node's 130 device ID (MAC address DHCP_CLI_MAC:00:00:00:00:00:04) as the lookup key and a matching request ID that corresponds to the DHCP request submitted by the client node 130. The relay node 110 may reference this transaction table to later identify the proper client node 130 to relay a DHCP response to. The transaction table may include one or more entries for each client node (e.g., client node 120, client node 130, client node 140) the relay node 110 operates as a virtual bridge for. Although the lookup key is described as being the device ID, according to other embodiments the request ID may be referenced as the lookup key to the transaction table 1000.

The home AP router 150 receives the relayed DHCP request from the relay node 110 through the first physical network. The home AP router 150 parses the DHCP request and in response, the home AP router 150 generates an IP address to assign to the client node 130 into a DHCP response. The home AP router 150 then transmits the DHCP response back to the relay node 110 through the first physical network (403).

Within the data packet comprising the DHCP response, the home AP router includes the home AP router's 150 MAC address as the source MAC address (SRC_MAC 00:00:00:00:00:01), the relay node's 110 upstream interface's MAC address as the destination MAC address (DST_MAC: 00:00:00:00:00:02), the home AP router's 150 IP address as the source IP address (SRC_IP:192.168.0.1), the IP address to be assigned to the requesting client node 130 (YOUR IP:192.168.0.4), default gateway information for the home AP router 150 (Default gateway: 192.168.0.1), domain name system (DNS) server identification that identifies the home AP router 150 as the DNS server (DNS server: 192.168.0.1), and the DHCP requesting client identification which identifies the client node 130 (DHCP_CLI_MAC:00:00:00:00:00:04).

After the relay node 110 learns the IP address and the MAC address for the home AP router 150 with relation to the upstream interface (relay node wlan0), the relay node 110 creates an entry into an internal host record hash table identifying the device ID of the home AP router 150 (e.g., MAC address 00:00:00:00:00:01) and a corresponding entry describing the device network address for the home AP router 150 (e.g., IP address 192.168.0.1). The internal host record hash table may be stored within a memory of the relay node 110 as either part of, or distinct from, the transaction table 1000. In addition to the identifying information on the home AP router, the internal host record hash table may include identifying information identify a host's device ID and/or network address. For example, the internal host record hash table may identify the relay node 110 as a host device by identifying the device ID and network address for the upstream interface and downstream interface of the relay node 110. The internal host record hash table may use a network address as the lookup key for looking up entry records stored in the internal host record hash table.

The relay node 110 receives the DHCP response from the home AP router 150 through the relay node's 110 upstream interface (relay node wlan0) based on the identification of the relay node 110 as the destination MAC address (DST_MAC: 00:00:00:00:00:02). The relay node 110 then relays the DHCP response to the client node 130 based on the DHCP requesting client identification which identifies the client node 130 (DHCP_CLI_MAC:00:00:00:00:00:04) (404). In addition or alternatively, the relay node 110 may identify the client node 130 as the proper device to relay the DHCP response by referencing the transaction table 1000 and looking up the client node 130 based on the client node's 130 device ID (MAC: 00:00:00:00:00:04) as a lookup key. By using the client node's 130 device ID as the lookup key to the transaction table 1000, the relay node 110 locates the matching request ID and determines the client node 130 to be the device that initially requested the IP address in the DHCP request submitted by the client node 130, and therefore the present DHCP request belongs to the same message transaction. Either way, the relay node 110 is able to identify the client node 130 and relay the DHCP response to the client node 130 accordingly. The DHCP response is relayed to the client node 130 through the relay node's 110 downstream interface (relay node wlan1) and via the second physical network.

Upon receiving the DHCP response, the client node 130 recognizes that it has been assigned the IP address 192.168.0.4 within the mesh network system 100. With the DHCP response, the client node 130 also recognizes the default gateway information (192.168.0.1) and the DNS server information (192.168.0.1) for the mesh network system 100. By operating according to the processes described by the flow diagram 400, the relay node 110 operates as a DHCP relay agent within the mesh network system 100 by forwarding and manipulating the data packet information within the DHCP request and DHCP response between the home AP router 150 (i.e., DHCP server) and the client node 130 requesting the identification assignment.

It is noted that if the relay node 110 had simply relayed the DHCP request from the downstream interface (relay node wlan1) to the upstream interface (relay node wlan0) at (402) without further switching a DHCP broadcast flag on, the relay node 110 may not have been able to receive the DHCP response from the home AP router 150. This is because usually, a DHCP client sends the DHCP request with the DHCP broadcast flag off, which is interpreted by the DHCP server to directly reply to the DHCP request by transmitting the DHCP response using unicast directly to the client's MAC address specified by a CHADDR (Client hardware address) field in the data packet comprising the DHCP request. However, in our relay case, if the home AP router 150 (i.e., the DHCP server) had attempted to transmit the DHCP response directly to the client node's 130 MAC address 00:00:00:00:00:04, the relay node 110 would not have received the DHCP response and therefore the relay node 110 would not have been able to operate as a bridge between the client node 130 and the home AP router 150.

To deal with this technical problem, two technical solutions are provided: 1) turning on a DHCP broadcast flag, or 2) turning on a "DHCP relay agent" field during handling of the data packets comprising the DHCP request. By default, the relay node 110 may turn the DHCP broadcast flag on before handling the DHCP request and relaying the DHCP request to the home AP router 150 at (402). When the DHCP broadcast flag in the DHCP request is turned on, the home AP router 150 will transmit the DHCP response as a broadcast, where the relay node 110 may then pick up the broadcast DHCP response as described herein.

Alternatively, when the "DHCP relay agent" field is turned on, the relay node 110 will clear the DHCP broadcast flag, and put its own IP address (192.168.0.2) into the "DHCP relay agent" (GIADDR: Gateway IP address) protocol field in the DHCP request. The home AP router 150 (i.e., the DHCP server) is then enabled to transmit the DHCP response to the relay node's 110 IP address using unicast. The operational behavior of the relay node 110 acting as a DHCP relay agent is a standard procedure defined by, for example, the RFC 1542 standard protocol.

By the DHCP relay process described by flow diagram 400, the client node 130 may join the mesh network system 100 by being assigned an IP address (192.168.0.4) from the home AP router 150 operating as the DHCP server. The relay node 110 operates as a transparent bridge to enable communication of the DHCP request and the DHCP response between the client node 130 and the home AP router 150.

As described earlier, the tree mesh architecture 190 may include a daisy-chain configuration that results in multiple client nodes operating as a rely device, as described by the relay node 110. In such cases hen additional nodes are present between the relay node 110 and the home AP router 150, each subsequent node before the home AP router may operate as its own relay node to its child node(s) and implement the same processes implemented by the relay node 110 in the DHCP relay process described by flow diagram 400. A client device operating as a relay device may communicate with multiple children client nodes via multiple downstream interfaces according to any of the known communication protocols (wired or wireless protocols), while a client device operating as a relay device may communicate with parent nodes via a single upstream interface for relaying the DHCP request and DHCP response.

Figure 5:
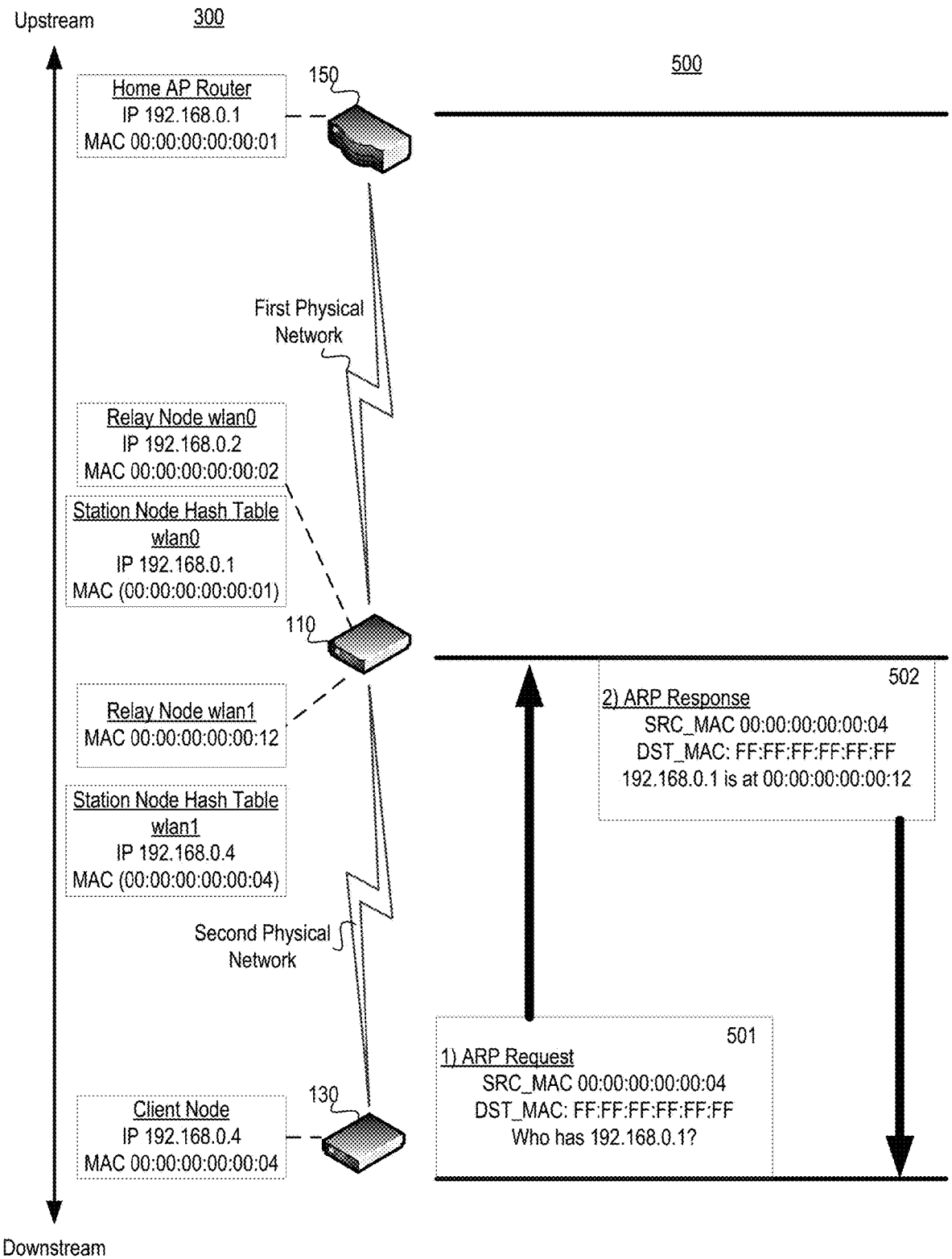
FIG. 5 shows a partial view of the mesh network system shown in FIG. 1 and corresponding communication between component devices for implementing a proxy protocol.

FIG. 5 shows the partial view 300 of the mesh network system 100, and further shows a corresponding flow diagram 500 describing a proxy address resolution protocol (proxy ARP) process implemented between the component devices within the partial view 300 of the mesh network system 100. The processes described by the flow diagram 500 are assumed to take place subsequent to the processes described by flow diagram 400. ARP is a known protocol used to map IP addresses to hardware addresses used by a data link protocol.

Each node within the mesh network system 100 may sniff for ARP data packets over either its upstream interface or downstream interface to discover other nodes connected to the corresponding physical network. When an ARP request is received by the node over one of its interfaces, the receiving node may parse the ARP request to learn the sender's IP address, MAC address, and/or location that is included in the data packet of the ARP request. The receiving node may then use the source's IP address as a key to update entries in its host record hash table. Each entry in the host record hash table may contain the host's (i.e., node's) information on IP address, MAC address, and/or location. When the receiving node discovers a new node, the receiving node may create a new entry into its host record hash table.

Now referring back to the flow diagram 500, for the client node 130 to now access a particular hypertext transfer protocol (HTTP) server to, for example, view a website on the Internet such as www.amazon.com, the client node 130 will need to resolve a domain name system (DNS) name for the website. The DNS server in the mesh network system 100 is the home AP router 150, and the client node 130 will need to learn the MAC address for the home AP router 150 by mapping the IP address of the home AP router 150 to the MAC address for the home AP router 150 using the ARP. This process may include the following processes described by flow diagram 500.

Knowing the IP address for the home AP router 150 that assigned the client node's 130 own IP address, the client node 130 transmits an ARP request asking for the MAC address of the device having IP address 192.168.0.1 over the second physical network (501). The data packet comprising the ARP request may further include the client node's 130 MAC address as the source MAC address. However, the destination MAC address will not be known in the ARP request.

The relay node 110 receives the ARP request through the downstream interface (relay node wlan1) via the second physical network. After receiving the ARP request, the relay node 110 parses the host record hash table to identify the MAC address of the home AP router 150 that is operating as the DHCP server. The relay node 110 then recognizes that the home AP router 150 having IP address 192.168.0.1 communicates with the relay node 110 through the relay node's 110 upstream interface (relay node wlan0) via the first physical network.

To maintain transparency, the relay node 110 returns an ARP response through the second physical network, where the ARP response identifies the MAC address for the downstream interface (MAC 00:00:00:00:00:12) as the MAC address of the requested device having IP address 198.168.01 (502). The client node receives the ARP response and will then communicate through the relay node 110 when accessing websites, and the relay node 110 will relay such HTTP requests to the proper home AP router 150.

Through this proxy ARP process described by flow diagram 500, the relay node 110 may further learn the MAC address (MAC 00:00:00:00:00:04) for the client node 130, and the relay node 110 may store the learned MAC address for the client node 130 into the host record hash table for later look-up.

For purposes of maintaining an up-to-date host record hash table, each mesh node within the mesh network system 100 may periodically send direct "keep-alive" APR requests to all the hosts recorded in the host record hash table. If a host doesn't reply to this "keep-alive" APR requests for a predefined number (K) of times, the host will be removed from the host record hash table.

Figure 6:
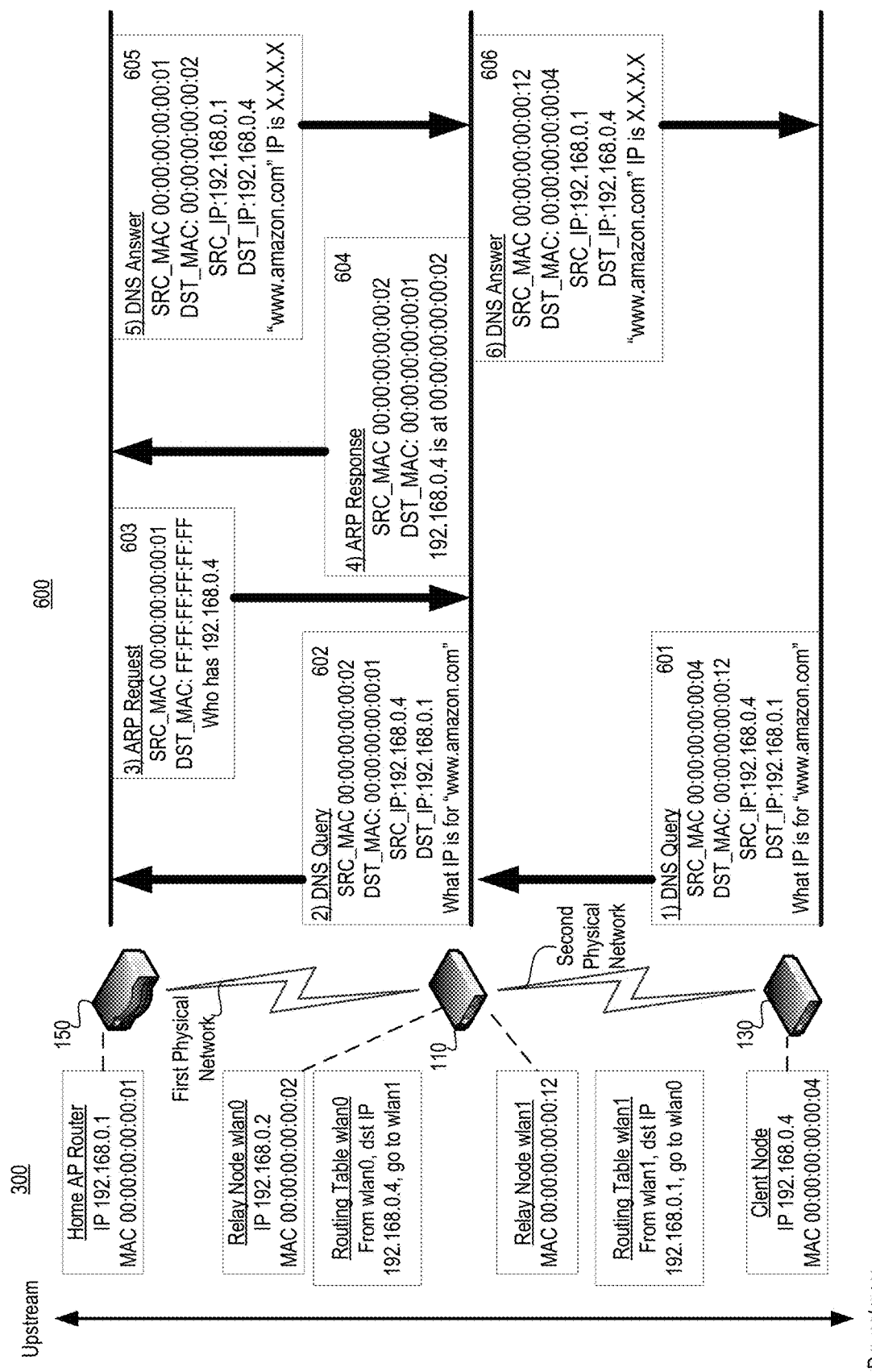
FIG. 6 shows a partial view of the mesh network system shown in FIG. 1 and corresponding communication between component devices for implementing a policy based routing process.

FIG. 6 shows the partial view 300 of the mesh network system 100, and further shows a corresponding flow diagram 600 describing a policy based routing (PBR) process implemented between the component devices within the partial view 300 of the mesh network system 100. The processes described by the flow diagram 600 are assumed to take place subsequent to the processes described by flow diagram 500. The policy based routing is a way to have a set policy override routing protocol decisions. Policy based routing includes mechanisms for selectively applying policies based on an access list, a packet size or other criteria set by a network administrator. A router may be responsible for deciding where to forward a received data packet based on the destination address in the data packet, which is then used to look up an entry in a routing rules table. However, in some cases, there may be a need to forward the packet based on other criteria, and this is where PBR can be used to redirect traffic to a proxy designated by the policy rules.

In the mesh network system 100, the home AP router operates as the DNS server having an IP address (198.168.0.1) and MAC address (00:00:00:00:00:01) known to the relay node 110. However, after the proxy ARP process described by flow diagram 500, the client node 130 learns the MAC address for the DNS server to be 00:00:00:00:00:12, which actually corresponds to the downstream interface of the relay node 110. This is done to preserve the transparency of the relay node 110 that will operate as a bridge to receive and relay requests and responses between the client node 130 and the home AP router 150.

Based on the information known to the relay node 110, the relay node 110 creates two new routing rule entries into the host record hash table. The first routing rule entry states that data packets (i.e., requests, queries, responses) received through the upstream interface (relay node wlan0) and having a destination of IP address 192.168.0.4, will be relayed through the downstream interface (relay node wlan1). The second routing rule entry states that data packets received through the downstream interface and having a destination of IP address 192.168.0.1, will be relayed through the upstream interface. This way, a downstream routing policy and an upstream routing policy may be generated as a pair.

Following the proxy address resolution protocol (proxy ARP) process described by flow diagram 500, the client node 130 proceeds to resolve its attempt to access the webpage by broadcasting out a DNS query including the data packet information as shown in flow diagram 600 (601). The DNS query is transmitted to IP address 192.168.0.1 which actually coincides with the downstream interface of the relay node 110 because the client node 130 believes this is the IP address for the DNS server. This is represented by the destination MAC address in the DNS query identifying the upstream interface of the relay node 110 (DST_MAC: 00:00:00:00:00:12), and the destination IP address in the DNS query identifying the home AP router (DST_IP: 192.168.0.1).

After receiving the DNS query, the relay node 110 updates the destination MAC address in the DNS query to identify the home AP router 150 (DST_MAC: 00:00:00:00:00:01), and updates the source MAC address to identify the upstream interface (SRC_MAC: 00:00:00:00:00:02). Then according to the routing rules stored in the host record hash table, the relay node 110 transmits the updated DNS query to the home AP router 150 that is operating as the DNS server (602).

After the DNS query is received by the home AP router 150, but prior to transmitting a DNS answer, the home AP router 150 transmits an ARP request to the relay node 110 (603). The ARP request transmitted by the home AP router asks who has the IP address 198.168.04 that is identified as the source IP address (SRC_IP: 198.168.04) in the DNS query.

Upon receiving the ARP request, the relay node 110 replies with an ARP response that identifies IP address 198.168.04 is at MAC address 00:00:00:00:00:02, which coincides with the MAC address of the relay node's 110 upstream interface (604). The ARP response is transmitted back to the home AP router 150.

After receiving the ARP response, the home AP router transmits the DNS answer back to the relay node 110, where the DNS answer includes the IP address (or other location/identification information) for the webpage (605).

After receiving the DNS answer from the home AP router 150, the relay node 110 updates the data packet information within the DNS answer before transmitting the updated DNS answer to the client node 130 having originally requested the DNS answer (606). The updated DNS answer updates the source MAC address to identify the relay node's 110 downstream interface, and updates the destination MAC address to identify the client node 130.

After the policy based routing process described by flow diagram 600 is implemented, the client node 130 and home AP router 150 may communicate with each other as if they were both located on the same Layer-2 physical network. The client node 130 and the home AP router 150 is able to achieve this communication due to the relay node 110 acting as the softAP bridge, where the softAP bridge is operating as a transparent Layer-3 bridging router between the client node 130 and the home AP router 150.

Although the PBR process described by the flow diagram 600 specifically describes the usage case for communicating a DNS query, other usage cases for the PBR process are applicable. For example, instead of the DNS query, the client node 130 may transmit an uplink request or downlink request to a website server. In response, a corresponding uplink or downlink answer may be responded back to the client node 130.

Figure 7:
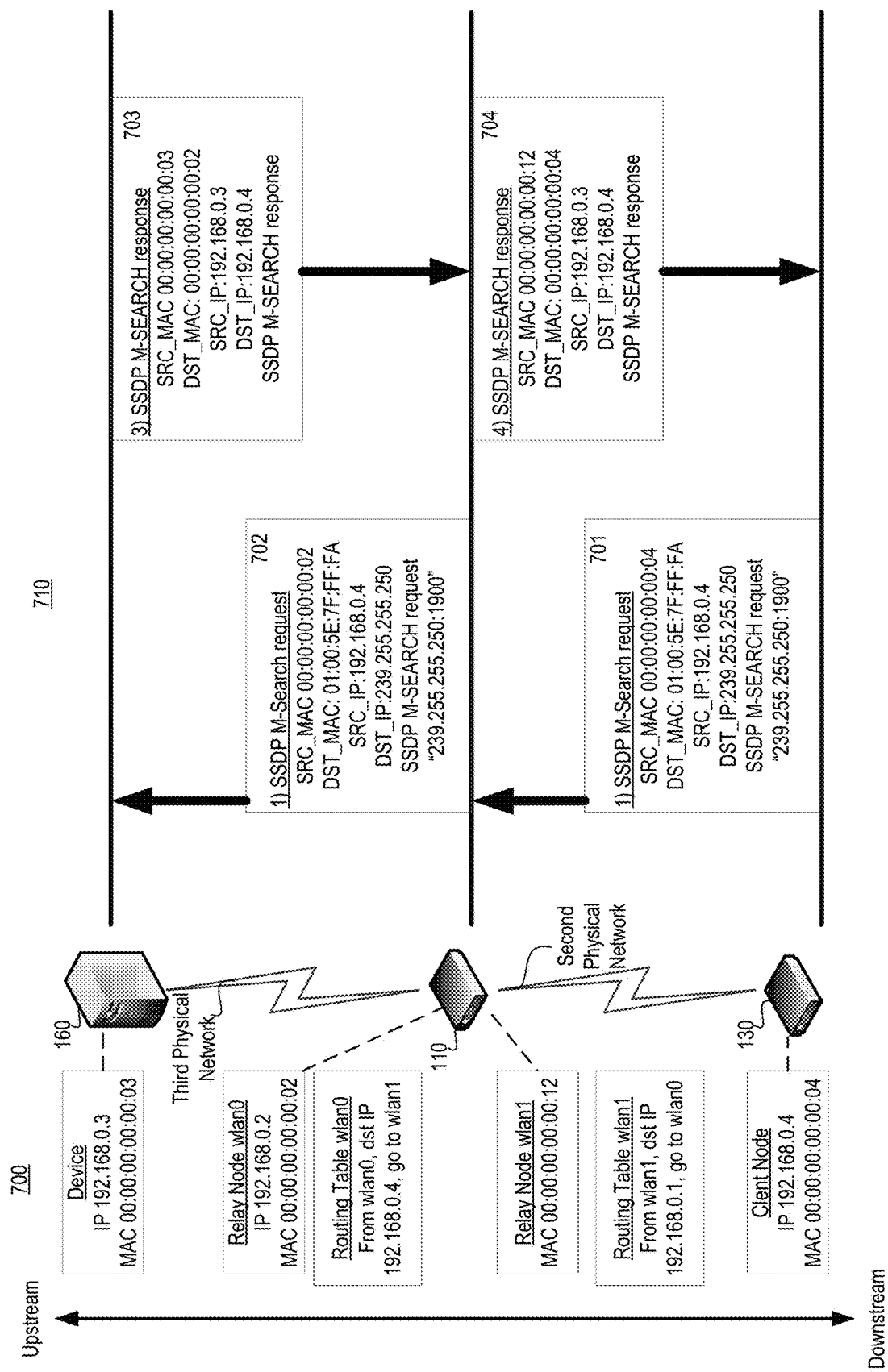
FIG. 7 shows a partial view of the mesh network system shown in FIG. 1 and corresponding communication between component devices for implementing a broadcast and multicast forwarding process.

FIG. 7 shows a partial view 700 of the mesh network system 100, and further shows a corresponding flow diagram 710 describing broadcast and multicast forwarding processes implemented between the component devices within the partial view 300 of the mesh network system 100. The processes described by the flow diagram 710 are assumed to take place subsequent to the processes described by flow diagram 600. The relay node 110 may also operate to forward/relay broadcast and multicast data packets between nodes in the second physical network and nodes in the first physical network. This way, nodes across the second physical network and the first physical network may discover each other using broadcast and multicast protocols such as SSDP (simple service discovery protocol) and mDNS (multicast DNS).

The client node 130 transmits a multicast data packet (SSDP M-Search request) to discover services over the SSDP that are available within the mesh network system 100 (701). The destination IP address for the SSDP M-Search request is the multicast IP address (SSDP group address 239.255.255.250), and the destination MAC address is 01:00:5E:7F:FF:FA that is mapped to the multicast IP address.

The relay node 110 receives the SSDP M-Search request over its downstream interface and updates the source MAC address within the SSDP M-Search request to identify relay node's 110 upstream interface (00:00:00:00:00:02). The relay node 110 then broadcasts the updated SSDP M-Search request over the first physical network through its upstream interface (702).

The wireless capable device 160 that is connected to the home AP router 150, may also include a connection with the relay node 110 through a third physical network. The wireless capable device 160 receives the updated SSDP M-Search request from the relay node 110 through the third physical network. After receiving the updated SSDP M-Search request from the relay node 110, the wireless capable device 160 generates and transmits a reply with a unicast data packet in the form of the SSDP M-Search response (703). The SSDP M-Search response may be addressed to IP address 192.168.0.4 with a destination MAC address of 00:00:00:00:00:02, because the wireless capable device 160 believes IP address 192.168.0.4 has the MAC address 00:00:00:00:00:02 based on the data packet information received in the SSDP M-Search request.

The relay node 110 having MAC address 00:00:00:00:00:02 receives the SSDP M-Search response from the wireless capable device 160, and the relay node 110 forwards the SSDP M-Search response to the client node 130 by kernel mode routing (704). The SSDP M-Search response is forwarded to the client node 130 by the kernel mode routing because the relay node 110 recognizes the SSDP M-Search response is a unicast data packet.

Although the broadcast and multicast forwarding processes described by the flow diagram 710 specifically describes the usage case for communicating an SSDP M-Search request, other usage cases for different types of multicast protocols are also applicable. For example, instead of the SSDP M-Search request, the client node 130 may transmit an mDNS, upnp, iptv, or other multicast protocol request. In response, the wireless capable device 160 may respond with a corresponding mDNS, upnp, iptv, or other multicast protocol response.

Figure 8:
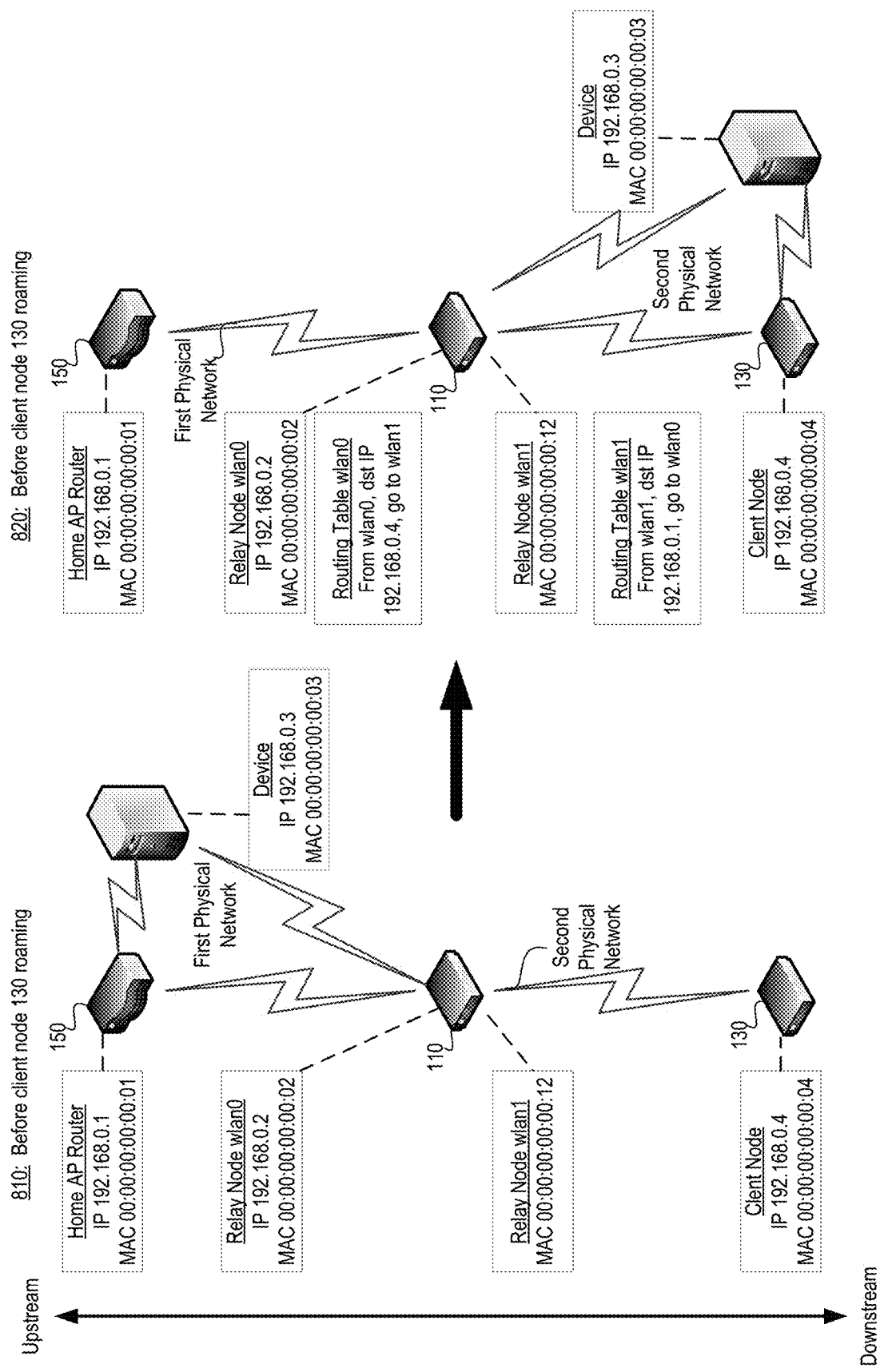
FIG. 8 shows a partial view of the mesh network system shown in FIG. 1 before and after a component device enters a roaming mode.

FIG. 8 shows a first partial view 810 of the mesh network system 100 and a second partial view 820 of the mesh network system 100. The first partial view 810 corresponds to a configuration of the mesh network system 100 before wireless capable device 160 goes into a roaming mode, and the second partial view 820 corresponds to a configuration of the mesh network system 100 after the wireless capable device 160 goes into the roaming mode.

The change in configuration from the first partial view 810 to the second partial view 820 describes how the relay node 110 handles the wireless capable device 160 roaming between the relay node's 110 upstream interface and the downstream interface. For example, the wireless capable device 160 may switch from communicating externally through the home AP router 150 to communicating through the relay node's 110 softAP bridge.

As shown by the first partial view 810, prior to the wireless capable device 160 entering the roaming mode, the wireless capable device 160 is assigned the IP address 192.168.0.3 and has the MAC address 00:00:00:00:00:03. From the viewpoint of the home AP router 150, the wireless capable device 160 is understood to have the IP address 192.168.0.3 and the MAC address 00:00:00:00:00:03. This is because the home AP router 150, the wireless capable device 160, and the relay node 110 are on the same first physical network. Further, the relay node 110 does not need to run a proxy ARP for the home AP router 150 because the wireless capable device 160 and the relay node 110 are on the same first physical network.

From the viewpoint of the client node 130, the wireless capable device 160 having IP address 192.168.0.3 will have a MAC address 00:00:00:00:00:12 corresponding to the relay node's 110 upstream interface. This is because from the viewpoint of the client node 130, the relay node 110 is operating as a proxy ARP for the wireless capable device 160 on the second physical network.

The second partial view 820 describes the component devices of the mesh network system 100 after the wireless capable device 160 switches from being within the first physical network to being within the second physical network. After the roaming, the wireless capable device 160 still gets the same IP address 192.168.0.3 from the same DHCP server because the DHCP server always assigns the same IP address to the same MAC address. Thus the main change for the overall mesh network system 100 following the wireless capable device joining the second physical network is that the MAC address of the wireless capable device 160 is changed in the point of view of all other nodes.

Following the roaming and after the wireless capable device 160 joins the second physical network, the wireless capable device 160 immediately broadcasts ARP requests to ask for the default gateway for the home AP router 150 having IP address 192.168.0.1's MAC address. The client node 130 receives the data packet of the ARP request and updates its ARP cache as follows: 192.168.0.3's MAC address is 00:00:00:00:00:03, not 00:00:00:00:00:12 anymore.

The relay node 110 may also receive this ARP request broadcast by the wireless capable device 160 over its downstream interface (relay node wlan1). Then according to the host record hash table entries, the relay node 110 learns that 192.168.0.3 has roamed from its upstream interface (first physical network) to its downstream interface (second physical network). Upon learning this roaming detail, the relay node 110 first updates the routing rules associated with the wireless capable device 160 within the host record hash table. For example, the routing rules associated with the wireless capable device 160 may be changed as follows: "from relay node wlan1, destination 192.168.0.3, go to relay node wlan0" becomes "from relay node wlan0, destination 192.168.0.3, go to relay node wlan1."

The relay node 110 knows that the home AP router with IP address 192.168.0.1 is not on the second physical network, so the relay node 110 runs a proxy ARP to reply to the wireless capable device's 160 ARP request. The ARP reply generated by the relay node 110 may identify the device with IP address 192.168.0.1 has the MAC address 00:00:00:00:00:12 (corresponding to the relay node's 110 downstream interface). While this allows for communication of the client node 130 and the wireless capable device 160, the home AP router 150 still has the old ARP cache stating the device with IP address 192.168.0.3 has a MAC address 00:00:00:00:00:03 (corresponding to the wireless capable device 160) because the home AP router 150 is not yet able to receive the broadcast ARP packets sent by the wireless capable device 160 from the second physical network. Therefore, the relay node 110 immediately begins it bridging operation by sending a broadcast gratuitous ARP announcement over the first physical network: IP 192.168.0.3 has MAC address 00:00:00:00:00:02. The gratuitous ARP announcement causes the home AP router 150 to update its ARP cache to reflect the change to the MAC address of the wireless capable device 160.

Following the described ARP exchanges, all the identified component devices (e.g., client node 130, wireless capable device 160, home AP router 150) on the mesh network system 100 may adapt to the network structure change caused by the wireless capable device 160 roaming to join the second physical network from the first physical network. The relay node 110 may also update its host record hash table accordingly.

Figure 9:
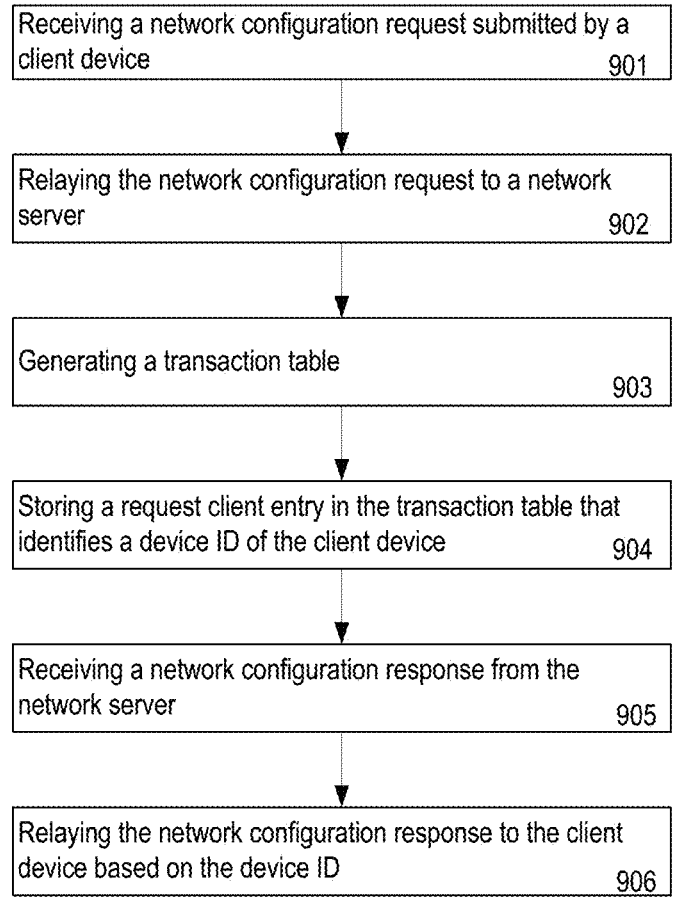
FIG. 9 shows a flow chart of logic describing a process for communicating between component devices of the mesh network system shown in FIG. 1.

FIG. 9 shows a flow diagram 900 describing processes that may be executed by, for example, the relay node 110 while processing a request for network configuration submitted by, for example, the client node 130. The network configuration request may be a request for an IP address assignment within the mesh network system 100 submitted by the client node 130, similar to the DHCP process described herein.

The relay node 110 may initially receive a network configuration request submitted by the client node 130 (901). The network configuration request may include the data packets from the DHCP request transmitted by the client node 130 at (401) in the DHCP relay process described by flow diagram 400.

Upon receiving the network configuration request, the relay node 110 relays the network configuration request to a network server, such as the home AP router 150 (902). The relay node 110 may update the network configuration request before transmitting the network configuration request to the network server, as described by the updating to the DHCP request by the relay node 110 at (402) in the DHCP relay process described by flow diagram 400. Before relaying the network configuration request, the relay node 110 may turn on a broadcast flag or relay agent field in the network configuration request. Turning on the broadcast flag or relay agent field designates the relay node 110 as a relay agent within the mesh network system 100.

The relay node 110 further generates a transaction table describing communications (e.g., requests, replies, inquires, and answers) relayed through the relay node 110 and attributes of component devices within he mesh network system (903). The transaction table may be maintained to keep track of locations and roles taken on by component devices within the mesh network system 100. For example, the transaction table may be representative of the internal host record hash table and/or DHCP request transaction hash table generated and maintained by the relay node 110.

After generating the transaction table, the relay node 110 stores a request client entry into the transaction table (904). The request client entry identifies the client node 130 that submitted the network configuration request, and uses the device ID of the client node 130 as a lookup key to the transaction table for looking up the request client entry when later relaying a response message back to the client node 130. The device ID may be, for example, a MAC address of the client node 130 that is identified within the network configuration request. The request client entry may include the lookup key and a corresponding request ID that identifies the network configuration request submitted by the client node 130.

The relay node 110 receives a network configuration response from the network server (905). The network configuration response includes a client address (e.g., IP address) assigned to the client node 130 that submitted the network configuration request. The network configuration response may include the data packets from the DHCP response transmitted by the home AP router 150 at (403) in the DHCP relay process described by flow diagram 400.

The relay node 110 then relays the network configuration response to the client node 130 (906). Upon receiving the network configuration response, the client node 130 recognizes the client address (e.g., IP address) assigned to the client node 130 by the network server. The replay process may correspond to the relay process at (404) in the DHCP relay process described by flow diagram 400.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

What is claimed is:

1. A relay computing device comprising:
a first interface configured to communicate with a client device;
a second interface configured to communicate with a network router;
a memory configured to store a transaction table including a lookup key and a corresponding request identifier (ID); and
a processor in communication with the memory, the processor configured to:
receive an application network layer query provided by the client device based on a device ID of the first interface substituting as an application network layer server, the application network layer query including a client address as a query source address and the device ID of the first interface as a query destination address;
include the device ID of the first interface as a first source device ID in the application network layer query;
include a device ID of the network router as a first destination device ID in the application network layer query;
send the application network layer query to the network router;
receive an address resolution protocol (ARP) request from the network router, the ARP request from the network router requesting the first source device ID;
send an ARP response to the network router, the ARP response to the network router including the first source device ID;
receive an application network layer answer including an Internet Protocol (IP) address for a website identified in the application network layer query, the application network layer answer further including a client device ID, corresponding to the client device, as a second destination device ID and including the device ID of the first interface as a second source device ID; and
send the application network layer answer to the client device.

2. The relay computing device of claim 1, wherein the processor is further configured to:
receive a network configuration request from the client device;
enter, into the transaction table stored on the memory, a host entry including the client device ID as the lookup key and enter the network configuration request as a corresponding request ID;
turn on a dynamic host configuration protocol (DHCP) broadcast flag or turn on a DHCP relay agent field in the network configuration request; and send the network configuration request to the network router.

3. The relay computing device of claim 2, wherein the processor is further configured to:
prior to providing the network configuration request to the network router, replace the client device ID with a relay computing device ID in the network configuration request.

4. The relay computing device of claim 2, wherein the processor is further configured to:
receive a network configuration response from the network router, the network configuration response including a client address assigned to the client device by the network router;
retrieve the client device ID from the transaction table;
send the network configuration response to the client device based on the client device ID; and
wherein the network configuration response further includes at least a default gateway information including the network router or an application network layer server device ID.

5. The relay computing device of claim 2, wherein the first source device ID is an application network layer server device ID.

6. The relay computing device of claim 2, wherein the processor is further configured to:
generate a first routing policy instructing the relay computing device to route communications addressed to the client device ID through the first interface; and
generate a second routing policy instructing the relay computing device to route communications addressed to the device ID of the network router through the second interface.

7. The relay computing device of claim 1, wherein the processor is further configured to:
receive a multicast packet request, the multicast packet request including the client device ID as the first source device ID and including an IP address of a multicast address as a destination IP address;
send the multicast packet request to the network router;
receive a multicast packet response from the network router; and
send the multicast packet response to the client device.

8. The relay computing device of claim 2, wherein:
the network configuration request is a DHCP request;
the network router is serving as a DHCP server of a mesh network; and
the client device ID is a media access control (MAC) address of the client device.

9. A method for implementing a mesh network by creating a virtual bridge on a relay device, the method comprising:
receiving an application network layer query provided by a client device based on a device identifier (ID) of a first interface substituting as an application network layer server, the application network layer query including a client address as a query source address and the device ID of the first interface as a query destination address;
including the device ID of the first interface as a first source device ID in the application network layer query;
including the device ID of a network router as a first destination device ID in the application network layer query;
sending the application network layer query to the network router;
receiving an address resolution protocol (ARP) request from the network router, the ARP request from the network router requesting the first source device ID;
sending an ARP response to the network router, the ARP response to the network router including the first source device ID;
receiving an application network layer answer including an IP address for a website identified in the application network layer query, the application network layer answer further including a client device ID, corresponding to the client device, as a second destination device ID and including the device ID of the first interface as a second source device ID; and
sending the application network layer answer to the client device.

10. The method of claim 9, further comprising:
receiving a network configuration request from the client device;
entering, into a transaction table stored on a memory, a host entry including the client device ID as a lookup key and enter the network configuration request as a corresponding request ID;
turning on a dynamic host configuration protocol (DHCP) broadcast flag or turn on a DHCP relay agent field in the network configuration request; and
sending the network configuration request to the network router.

11. The method of claim 10, further comprising:
prior to sending the network configuration request to the network router, replacing the client device ID with a relay device ID in the network configuration request.

12. The method of claim 10, further comprising:
receiving a network configuration response from the network router, the network configuration response including a client address assigned to the client device by the network router;
retrieving the client device ID from the transaction table;
sending the network configuration response to the client device based on the client device ID; and
wherein the network configuration response further includes at least a default gateway information including the network router or an application network layer server device ID.

13. The method of claim 10, wherein the first source device ID is an application network layer server device ID.

14. The method of claim 10, further comprising:
generating a first routing policy instructing the relay device to route communications addressed to the client device ID through the first interface; and
generating a second routing policy instructing the relay device to route communications addressed to the device ID of the network router through a second interface.

15. The method of claim 9, further comprising:
receiving a multicast packet request, the multicast packet request including the client device ID as the first source device ID and including an IP address of a multicast address as a destination IP address;
sending the multicast packet request to the network router;
receiving a multicast packet response from the network router; and
sending the multicast packet response to the client device.

16. The method of claim 10, wherein the client device ID is a media access control (MAC) address of the client device.

* * * * *